(12) United States Patent
Kim et al.

(10) Patent No.: US 6,281,959 B1
(45) Date of Patent: Aug. 28, 2001

(54) CONNECTING PART OF OUTER CIRCUIT IN LIQUID CRYSTAL DISPLAY PANEL AND A FABRICATING METHOD THEREOF HAVING A PAD COVERED WITH A TRANSPARENT CONDUCTIVE LAYER

(75) Inventors: Byeong-Koo Kim; Yong-Min Ha, both of Kyongki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/123,886

(22) Filed: Jul. 28, 1998

(30) Foreign Application Priority Data

Jul. 29, 1997 (KR) .................................................. 97/35755

(51) Int. Cl.[7] ................................................. G02F 1/1345
(52) U.S. Cl. ............................................................ 349/152
(58) Field of Search .................................... 349/149, 151, 349/152

(56) References Cited

U.S. PATENT DOCUMENTS 5,744,820 * 4/1998 Matsushima et al. ................ 349/149
5,828,433 * 10/1998 Shin ....................................... 349/147
5,835,177 * 11/1998 Dohjo et al. ........................... 349/147

FOREIGN PATENT DOCUMENTS 63-191130    8/1988    (JP) .
3-25419      2/1991    (JP) .

* cited by examiner

Primary Examiner—Walter J. Malinowski
(74) Attorney, Agent, or Firm—Long Aldridge & Norman LLP (57) ABSTRACT

A connecting part of an outer circuit in a liquid crystal display panel includes a substrate and a plurality of pads on the substrate, where the pads are to be connected to the outer circuit. A first connecting wire is connected to one of said pads, the wire being arranged in a first direction. A second connecting wire is connected to another one of said pads, the second connecting wire being arranged in a second direction. The first and second connecting wires are formed to minimize overlapped areas over the pads at crossing points between the first and second connecting wires and the pads. The first connecting wire is bent toward the second direction at a point and connected to the driving circuit.

17 Claims, 11 Drawing Sheets

CONNECTING PART OF OUTER CIRCUIT IN LIQUID CRYSTAL DISPLAY PANEL AND A FABRICATING METHOD THEREOF HAVING A PAD COVERED WITH A TRANSPARENT CONDUCTIVE LAYER

BACKGROUND OF THE INVENTION

1. Field of the Invention

The present invention relates to a liquid crystal display, and more particularly, to a connecting part of an outer circuit in a liquid crystal display (LCD) panel and a fabricating method thereof

2. Discussion of the Related Art

Figure 1:
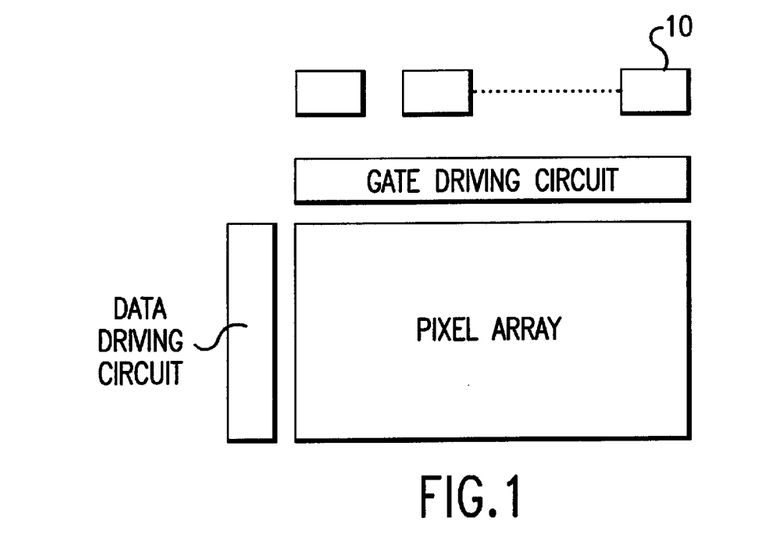
FIG. 1 shows a schematic layout of an LCD panel.

FIG. 1 shows a schematic structure of a conventional liquid crystal display panel.

A pixel array is in the middle of the substrate. A gate driver and a data driver, which are collectively called a driver, are at the left side and upper side of the pixel array, respectively. The gate driver drives each pixel of the pixel array and the data driver applies a data signal to each pixel. The gate and data drivers are connected electrically to each of the pixels. A driving circuit which is connected to the outer circuit 10 supplying a data input signal splits the data signals to be carried in turn to each pixel in the pixel array according to its own control signal.

In a liquid crystal display (LCD) device having a driving circuit and a substrate in one body, an outer circuit and the driving circuit are connected to each other by a pad when there are plenty of data input lines and control signal lines which are supplied from the outer circuit of the panel. Hence forward, the pad which connects the outer circuit to the driving circuit and the peripheral part are called a connecting part of the outer circuit. For the methods of connecting the panel to a driving IC to form the driving circuit with the substrate, Wire Bonding (WB), Tape Automated Bonding (TAB), or Chip on Glass (COG) are used.

Figure 2:
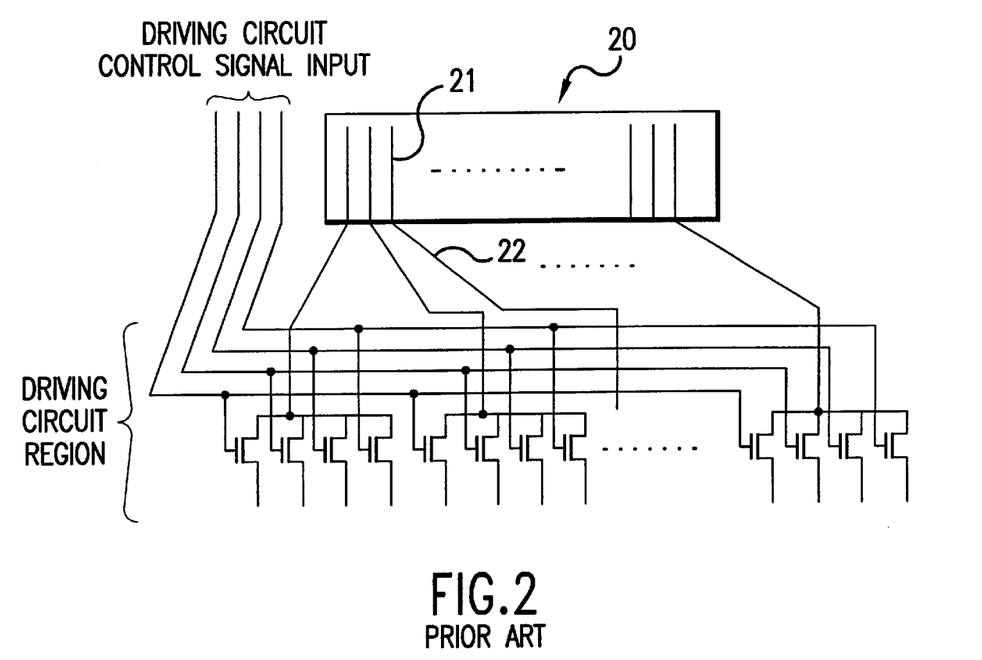
FIG. 2 shows a circuit of a connecting part of an outer circuit and a driver according to a conventional art.
Figure 3:
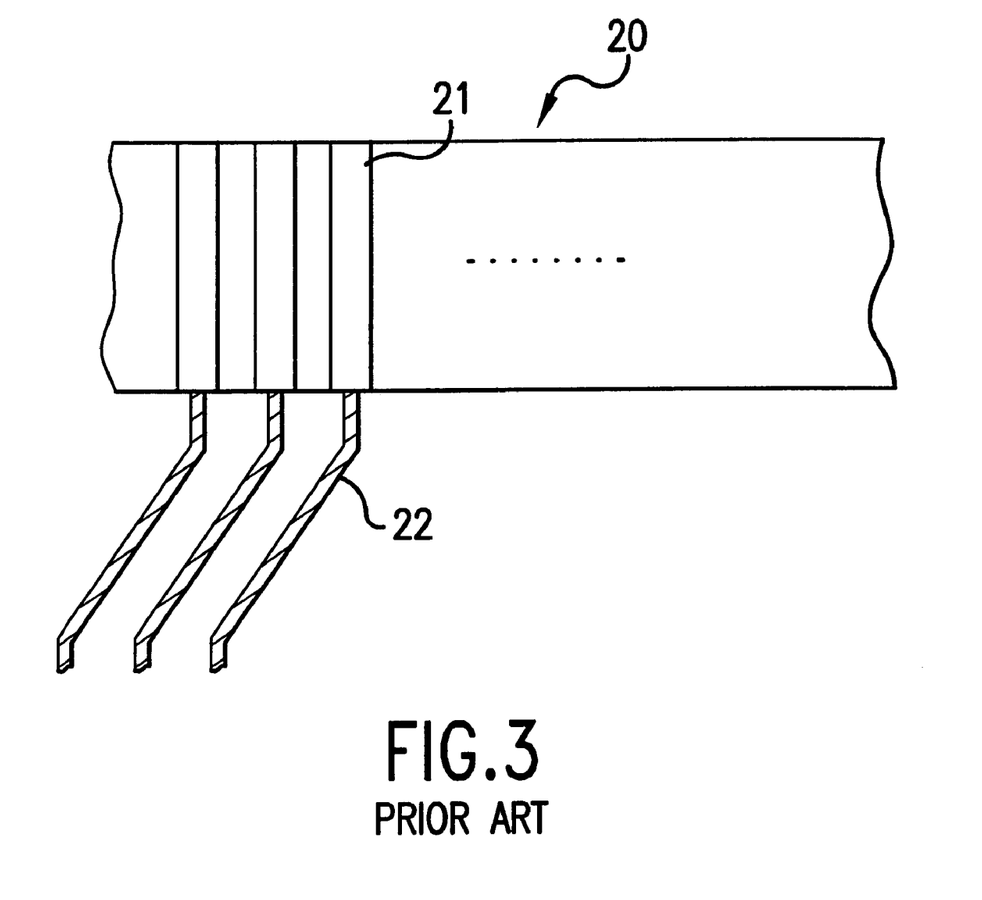
FIG. 3 shows a schematic layout of a connecting part of an outer circuit shown in FIG. 2.

FIG. 2 shows a portion of the connecting part of the outer circuit and the driver shown in FIG. 1, and FIG. 3 shows a schematic layout of the conductive lines for connection and the pads of the connecting part of the outer circuit in FIG. 2.

A plurality of pads 21 are formed in a connecting part of the outer circuit 20. Each pad 21 is connected to each chip of the driving circuit which is a data outer circuit source (not shown in the drawing) and receives a data driving signal. Each data driving signal diverges at the driver and then carries the data signal to the pixel array. FIG. 2 shows that a single wire 22 diverges into four wires by the driver. As a plurality of pads 21 are densely located at the connecting part of the outer circuit 20, space is needed for arranging these wires 22 to be connected to the driving (switch) circuit in which the wires 22 are to be connected to the pads 21. Namely, the wires 22 connected to a plurality of pads 21, which are densely arranged, should have a certain space to prevent an electrical short in the arranged space.

Wires 22 are connected to a connecting part of the outer circuit and arranged to one direction in a conventional art. Accordingly, each wire is formed to have a long line to secure a space which prevents electrical short. As a result, in the conventional art, a small and light panel is unable to be fabricated due to the large amount of space occupied by the wires.

SUMMARY OF THE INVENTION

Accordingly, the present invention is directed to a connecting part of outer circuit in liquid crystal display panel and a fabricating method thereof that substantially obviates one or more of the problems due to limitations and disadvantages of the related art.

An object of the present invention is to provide a connecting part of an outer circuit and fabricating method thereof which improves the arrangement of the wires connecting directly the connecting part of the outer circuit to the driving circuit to minimize the space required for the wires.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a connecting part of an outer circuit in a liquid crystal display panel of the present invention includes a plurality of pads formed on a substrate and connected to the outer circuit, at least a first connecting wire connected to each of the pads one on one and arranged in a first direction, and at least a second connecting wire connected to each of the pads except the pads connected to the first connecting wires and arranged in a second direction.

In another aspect of the present invention, a connecting part of an outer circuit in a liquid crystal display panel includes a substrate, a first connecting wire on the substrate, a first insulating layer covering the first connecting wire, a first contact hole through the first insulating layer wherein the first contact hole exposes a portion of the first connecting wire, and a pad connected to the first connecting wire through the first contact hole. The present invention further includes a second insulating layer covering the first connecting wire, a second contact hole in the second insulating layer wherein the second contact hole exposes a portion of the pad, and a transparent conductive layer connected to the second connecting wire through the second contact hole.

In a further aspect of the present invention, a method of fabricating a connecting part of an outer circuit in a liquid crystal display panel includes the steps of forming a first connecting wire on a substrate, forming a first insulating layer covering the first connecting wire, forming a first contact hole in the first insulating layer wherein the contact hole exposes a portion of the first connecting wire, and forming a pad connected to the first connecting wire through the first contact hole.

In another aspect of the present invention, a connecting part of an outer circuit in a liquid crystal display panel includes a substrate, a pad connected on the substrate, the pad being connected to the outer circuit, a first insulating layer on said pad, a first connecting wire on the first insulating layer, a second insulating layer covering said first connecting wire, a first and a second contact holes in the first and second insulating layers, the first and the second contact holes exposing portions of said pad, a third contact hole in the second insulating layers, the third contact hole exposing a portion of said first connecting wire; and a transparent conductive layer connected to the exposed portions of said pads and the exposed portion of said first connecting wire through said first, second and third contact holes.

In a further aspect of the present invention, a method of fabricating a connecting part of an outer circuit in a liquid crystal display panel includes the steps of forming a pad on a substrate, the pad being connected the outer circuit, forming a first insulating layer covering the pad, forming a first connecting wire on the first insulating layer, forming a second insulating layer covering said first connecting wire, forming a first and a second contact holes exposing portions of said pad in the first and second insulating layers and a third contact hole in the second insulating layer exposing a portion of said first connecting wire; and forming a transparent conductive layer connected to the exposed portions of said pads and the exposed portion of said first connecting wire through said first, second and third contact holes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the inventing and together with the description serve to explain the principle of the invention.

In the drawings.

DETAILED DESCRIPTION OF PREFERRED EMBODIMENTS

Reference will now be made in detail to the preferred embodiments of the present invention, examples of which are illustrated in the accompanying drawings.

Figure 4:
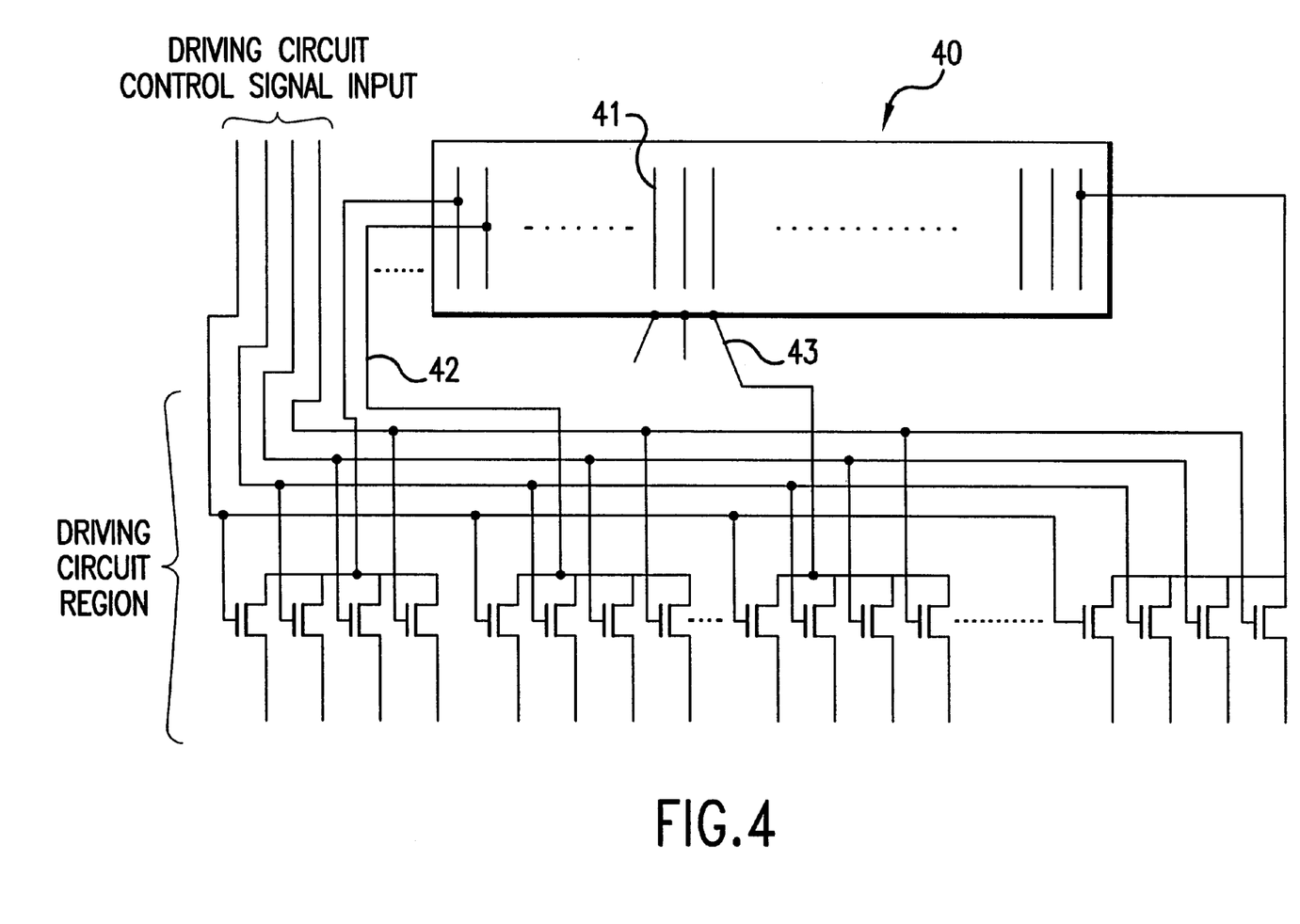
FIG. 4 shows a connecting part of an outer circuit in a preferred embodiment according to the present invention.
Figure 5:
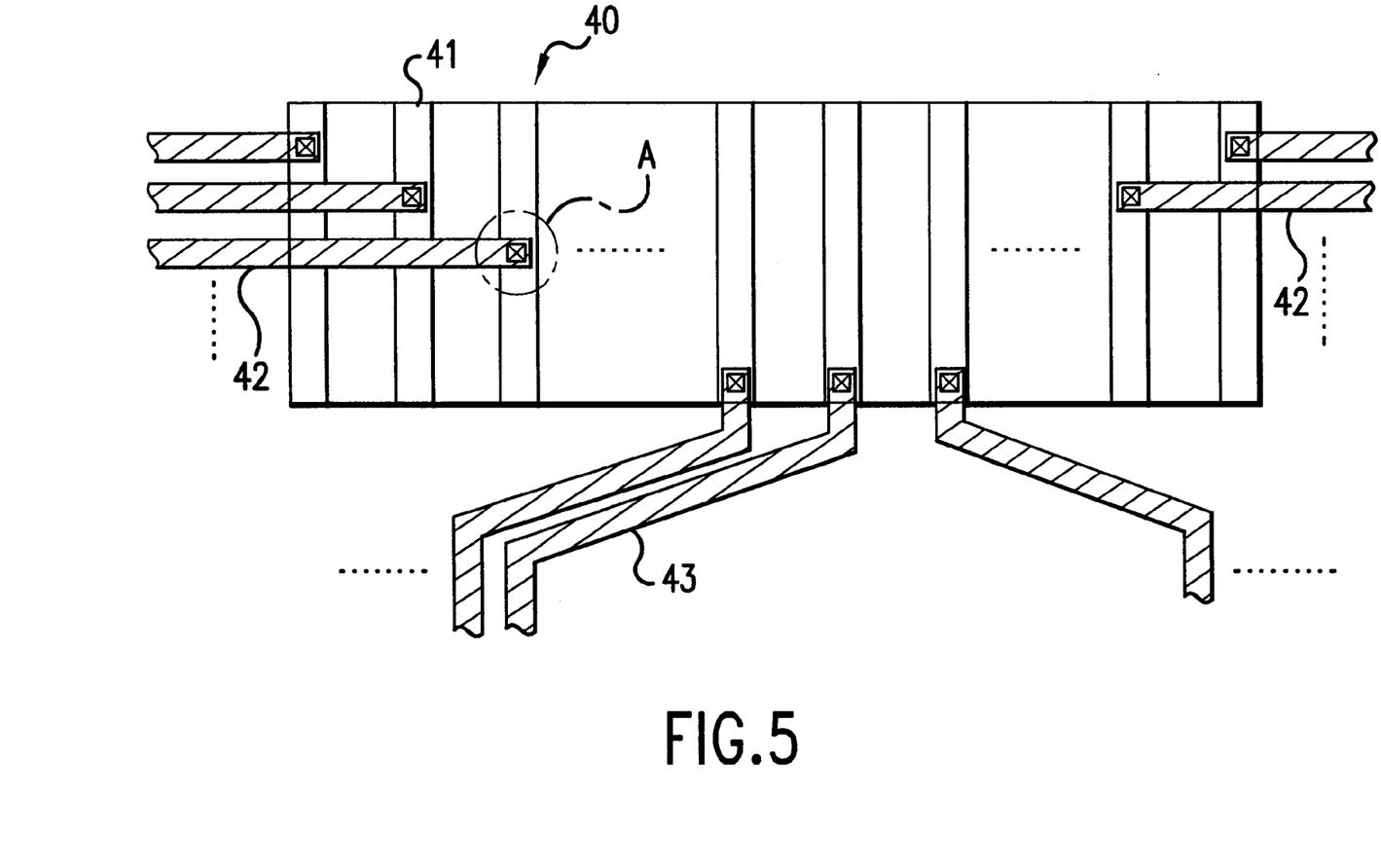
FIG. 5 shows a layout of a connecting part of the outer circuit and wires shown in FIG. 4.

FIG. 4 shows a connecting part of an outer circuit of a preferred embodiment according to the present invention, and FIG. 5 shows a layout of a connecting part of the outer circuit and wires shown in FIG. 4. Referring to FIGS. 4 and 5, a plurality of pads 41 and wires 42 connected to each of a plurality of the pads 41 are formed in a connecting part of outer circuit 40. Each pad 41 connected to a data driving chip (not shown in the drawing) receives a data driving signal. A driving signal connected electrically to each pad 41 diverges by a driver and then carries a data signal to a pixel array. The wires 42 and 43 from the connecting part of the outer circuit 40 diverge into four kind of wires by a driver (switch) operated by a driving circuit control signal.

In this case, the wires receive an input signal for an n input x m output device having a time division demultiplexing function, where m and n are integers and m is greater than n.

Each of the pads located at the middle of the connecting part of the outer circuit is connected to a driving circuit located at a lower part by the second wire 43 arranged in a column, while each of the remaining pads located at the side portions of the connecting part is arranged in a row-like fashion for a distance and then connected to the driving circuit by the first wire 42 which is bent or angled toward the driving circuit at a certain point or region. Namely, the present invention has a structure in which the number of the wires 43 in a column are reduced by drawing out the wires connected to the pads at the side portions of the connecting part of outer circuit to a space next to the side of the connecting part. Hence, the wires are not necessarily formed as a long-line type. The space occupied by the wires is reduced as compared to a conventional art, and enough space is provided to prevent electrical short.

Figure 6:
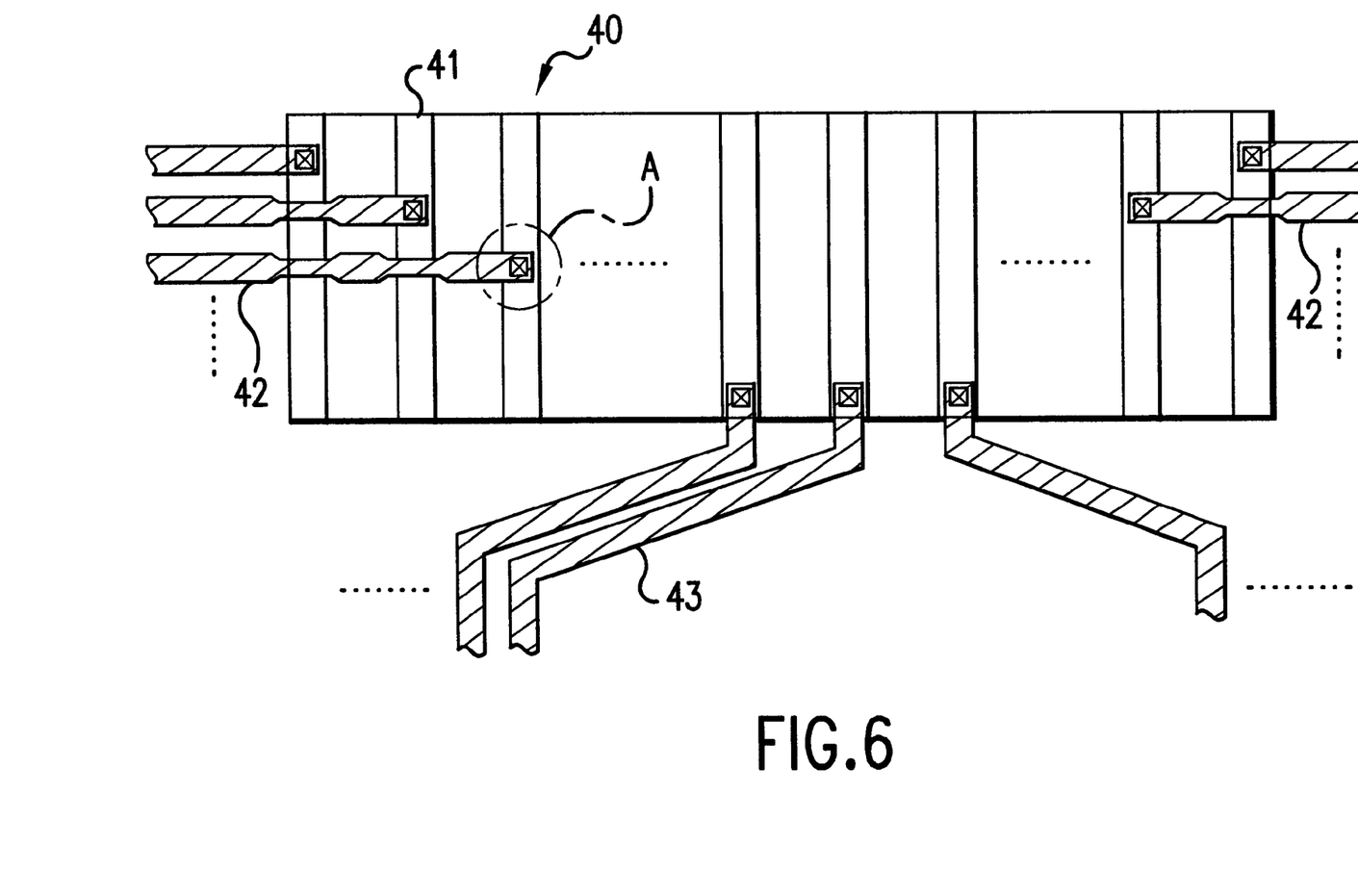
FIG. 6 shows another layout of a connecting part of the outer circuit and wires shown in FIG. 4.

FIG. 6 shows another layout of pads of the connecting part of the outer circuit and the wires, in which the shape and size of the wires are improved to minimize signal coupling caused by the crossing between the wires and the pads.

The structure of pads 40 and the wires 42 and 43 is similar to the other structure shown in FIG. 5, but the width of the first wire 42 is decreased at the crossing region between the pad 41 and the first wire 42. Because the width of the first wire is narrower at the crossing region, the overlapping area over the pad 41 is minimized or reduced as compared to the case where the first wire has a uniform shape and size. In this case, a distortion of a signal is also reduced by means of decreasing or minimizing the coupling capacitance for the overlap between the wire 42 and the pad 41. An insulating layer between the pad 41 and the first wire 42 is formed with a material having a low dielectric constant (<4.0) in order to minimize the coupling capacitance between the pad 41 and the first wire 42. In this case, the wires receive an input signal for an n input x m output device having a time division demultiplexing function, where m and n are integers and m is greater than n.

Figure 7:
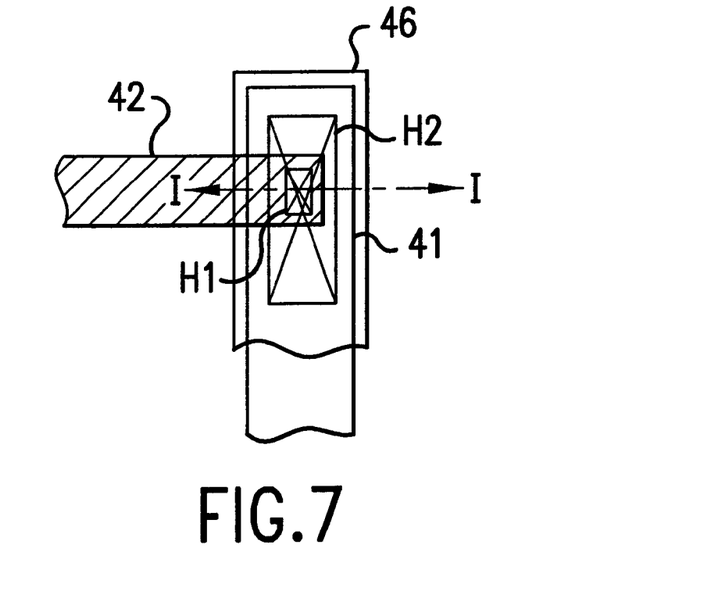
FIG. 7 shows a schematic layout of part A in FIG. 5 and FIG. 6.
Figure 8:
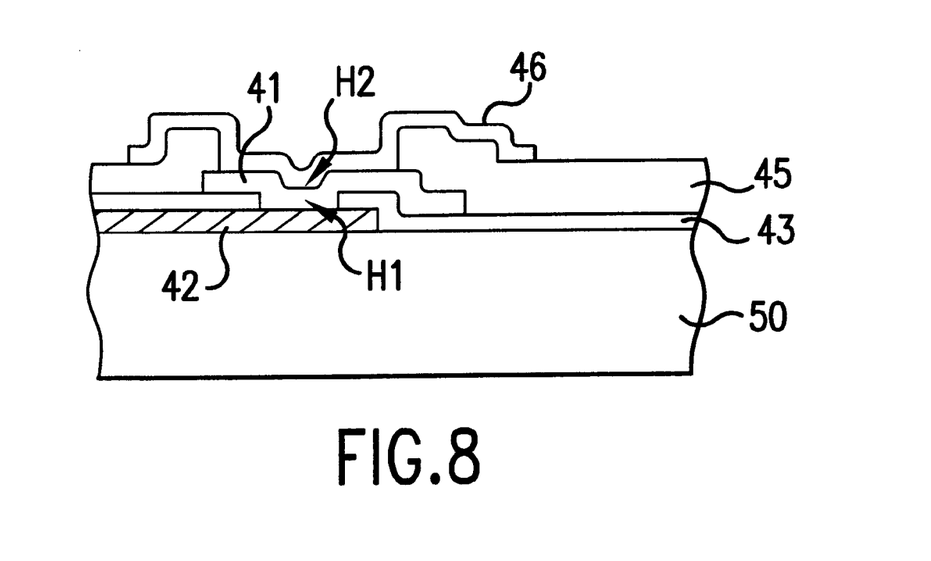
FIG. 8 shows a cross-sectional view taken along the line I—I in FIG. 7.

FIG.7 shows a schematic layout of a magnified version of part A in FIG. 5 and FIG. 6. Part A is a connecting part between the pad 41 and the first wire 42 drawn out in a row from the connecting part of the outer circuit. FIG. 8 shows a cross-sectional view of the connecting part of the first wire taken along the line I—I in FIG. 7. The first wire, being arranged in a row and preferably in the same direction of the connecting part of the outer circuit to a certain distance at which point the first wire is bent or angled toward the driving circuit.

Referring to FIGS. 7 and 8, the first wire 42 diverging at the driving circuit is connected to a pixel array shown in FIG. 4 on an insulated substrate 50. On the first wire 42, a first insulating layer 44 is formed having a contact hole H1 which exposes a portion of the first wire 42. On the first insulating layer 44, a pad 41 of the outer circuit connecting part is contacted with and connected to the first wire 42. The first wire 42 and the pad 41 have different extending directions, as shown in FIG. 6. Preferably, the first wire 42 extends in a direction perpendicular to the pad 41. A second insulating layer 45 covers the whole surface of the substrate but exposes a portion of the pad 41 through a second contact hole H2. On the second insulating layer 45, an ITO layer 46 connected to the pad 41 through the second contact hold H2 is formed.

In this case, a structure of a connection part of a second connecting wire 43 and an another pad is following. The second connecting wire 43 is formed on the substrate and the first insulating layer 44 covers the second connecting wire. Wherein the first insulating layer has a third contact hole exposing a portion of said second connecting wire. The (another) pad is connected to the second connecting wire 43 through the third contact hole and the second insulating layer 45 covers the second connecting wire 43. Wherein the second insulating layer has a fourth contact hole exposing a portion of the second pad. A transparent conductive layer is connected to the pad through the fourth contact hole.

Figure 9A:
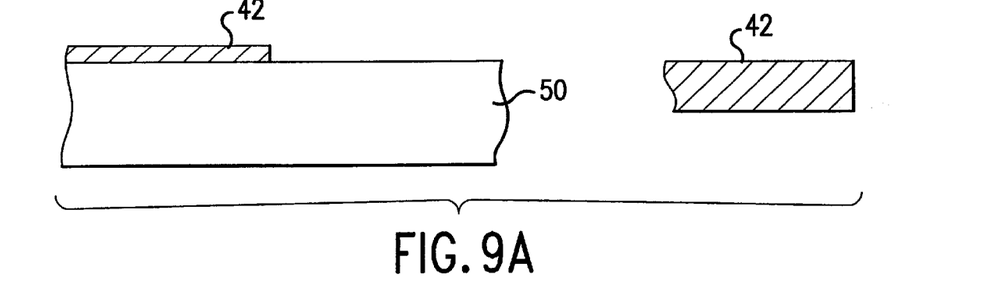
FIG. 9A to FIG. 9C show cross-sectional views taken along with the line I—I in FIG. 7 and layouts according to the present invention.
Figure 9B:
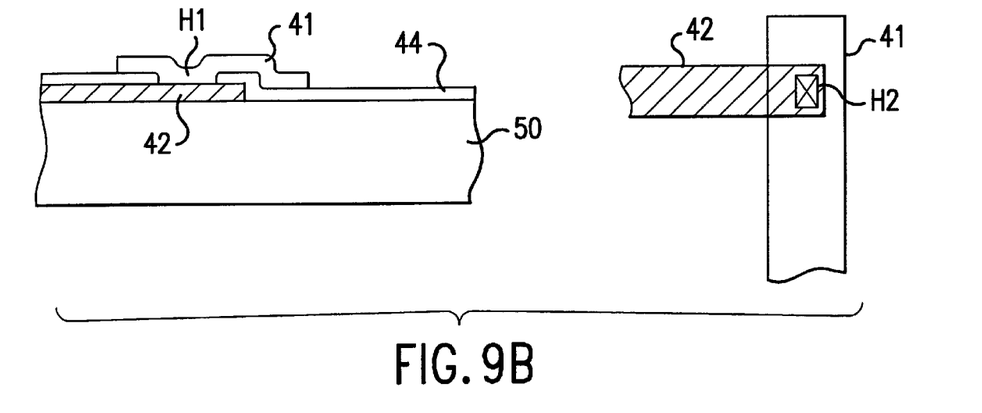
Figure 9C:
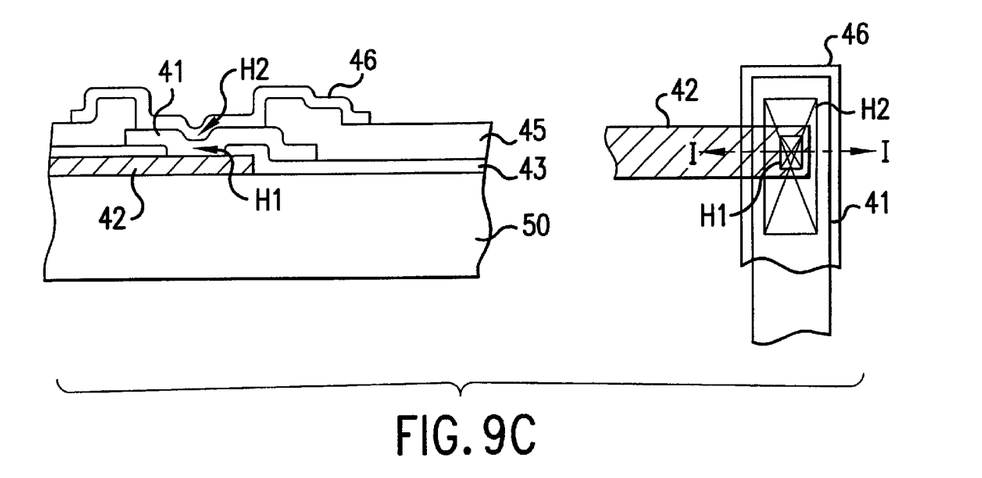

FIG. 9A to FIG. 9C show a process of fabrication, denoting the connecting part of the outer circuit.

Referring to FIG. 9A, a first connecting wire 42 is formed preferably by photolithography after a first conductive layer has been formed on an insulated substrate 50. The first connecting wire 42, as is shown in FIG. 4, is formed by patterning a portion of the wire 42 to be drawn out in a row-like fashion and the middle portion of the wire 42 to go down in a column-like fashion. The first conductive layer may be formed with a conductive material including one of Cr, Mo, Al and a combination of Cr, Mo and Al.

Referring to FIG. 9B, a first contact hole C1 exposing a certain part of a first insulating layer 44 is formed preferably by photolithography after the first insulating layer 44 covering the whole surface of the substrate has been formed. In this case, the first insulating layer 44 may be formed with either a silicon oxide layer or a silicon nitride layer. A pad 41 connected to the first connecting wire 42 is formed preferably by photolithography after a second conductive layer has been formed on the whole surface. The pad 41, as a pad of a tap bonding pad part in a long column shown in FIG. 4, may be formed with a material having a large electrical conductivity such as Cr, Mo, Al or a combination of such conductive materials. In this case, it is desirable that the shape of the first connecting wire be improved, as shown in FIG. 6, or the first insulating layer should be formed with a material having a low dielectric constant of less than 4.0.

Referring to FIG. 9C, a second contact hole C2 exposing a certain portion of a second insulating layer 45 is formed preferably by photolithography after a second insulating layer 45 covering the whole surface of the substrate has been formed. The second insulating layer 45 may be formed by means of depositing a silicon oxide layer or a silicon nitride layer. Then, a transparent conductive layer, such as ITO, is formed to cover the whole surface. The ITO layer 46 is preferably formed by photolithography.

Figure 10:
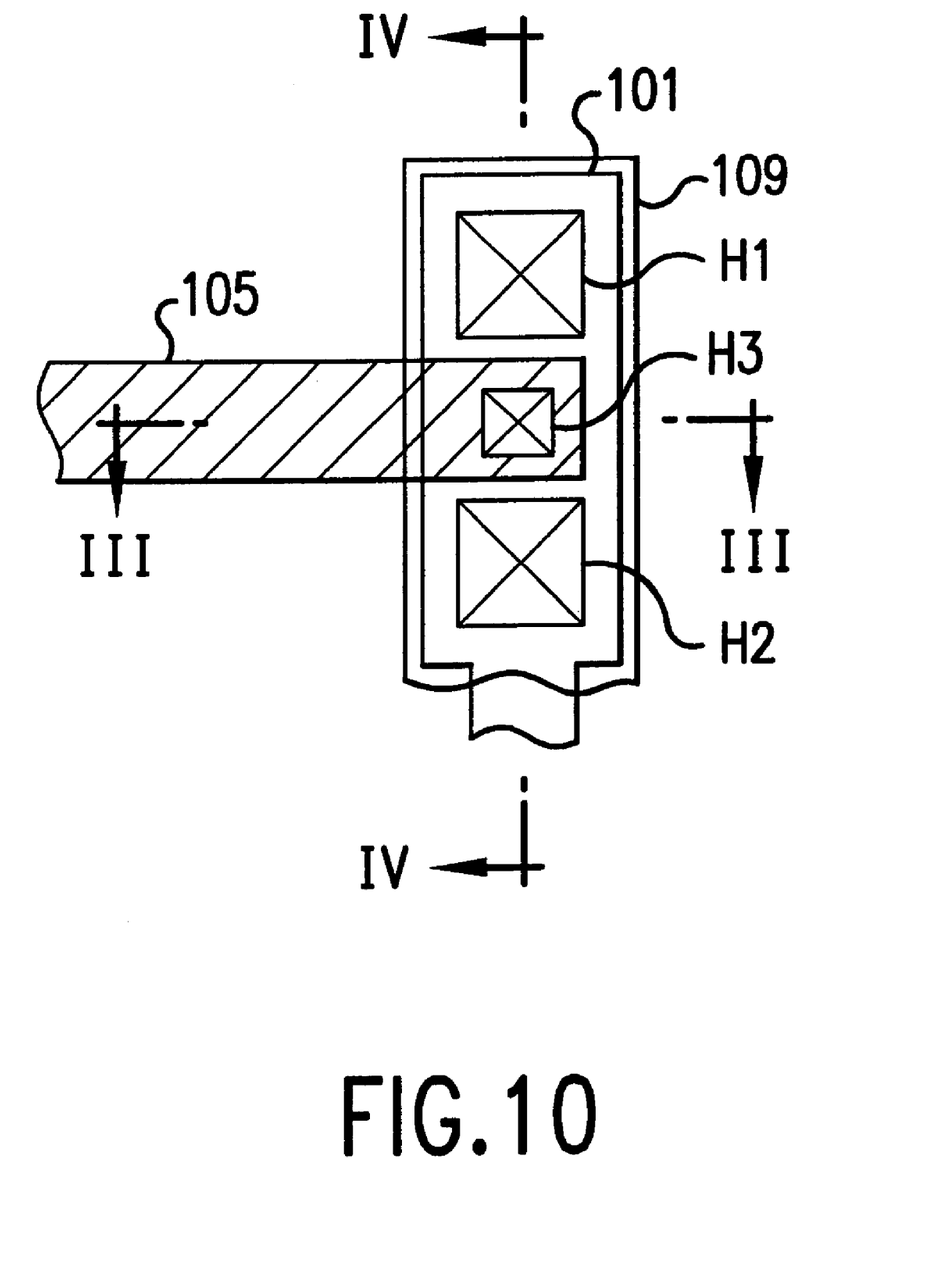
FIG. 10 shows a schematic layout of a magnified version of part A in FIGS. 5 and 6.
Figure 11A:
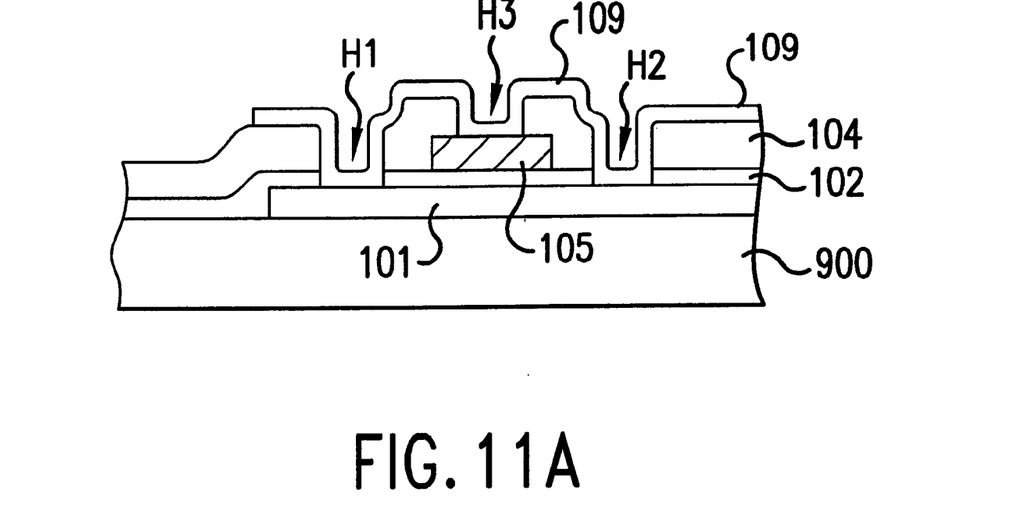
FIG. 11A shows a cross-sectional view of the connecting part of one of the first wires taken along the line III—III in FIG. 10.
Figure 11B:
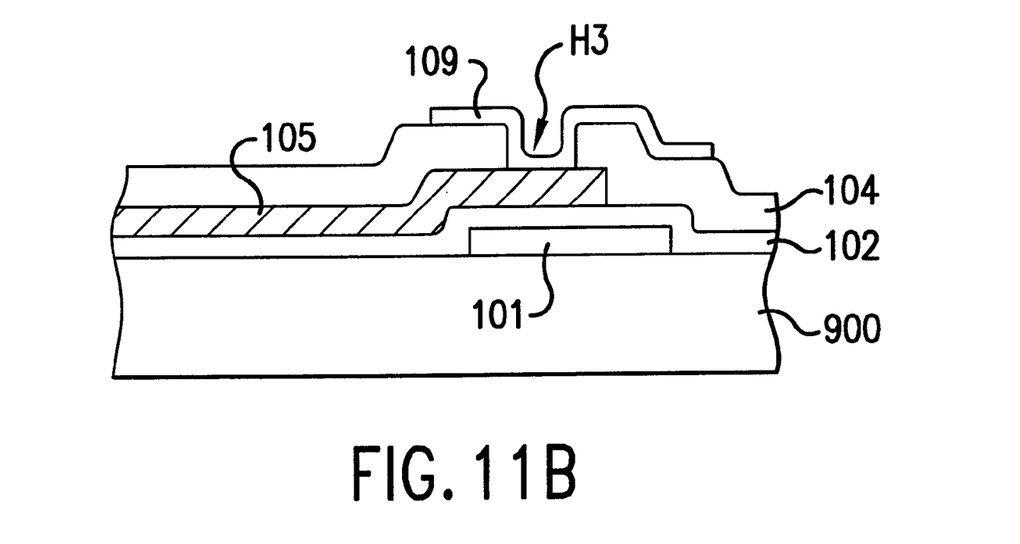
FIG. 11B shows a cross-sectional view of the connecting part of one of the first wires taken along the line IV—IV in FIG. 10.

FIG. 10 shows a schematic layout of a magnified version of part A in FIG. 5 and FIG. 6 according to a second embodiment of the present invention. Part A is a connecting part between the pad and one of the first wires drawn out in a row from the connecting part of the outer circuit. FIG. 11A shows a cross-sectional view of the connecting part of one of the first wires taken along the line III—III in FIG. 10. FIG. 11B shows a cross-sectional view of the connecting part of one of the first wires taken along the line IV—IV in FIG. 10. The first wires are arranged in a row and preferably in the same direction as the connecting part of the outer circuit to a certain distance at which point the first wire is bent or angled toward the driving circuit. The second embodiment of the present invention is preferably applied to an LCD structure where source and drain wires are formed on the insulating substrate and a coplanar transistor is formed on a buffer layer covering the source and drain wires. The wires receive an input signal for an n input x m output device having a time division demultiplexing function, where m and n are integers and m is greater than n.

Referring to FIGS. 10, 11A and 11B, a pad 101 of the outer circuit connecting part is formed on an insulated substrate 500. On the pad 101 and the insulated substrate 500, a first insulating layer 102 having contact holes H1 and H2 exposing portions of the pad 101 is formed. A first wire 105 is formed on the first insulating layer 102. The first wire and the pad preferably have different extending directions, as shown in FIG. 6. Preferably, the first wire extends in a direction perpendicular to the pad. A second insulating layer 104 covers the whole surface of the substrate but exposes portions of the pad 101 through a first contact hole H1 and a second contact hole H2 and a portion of the first wire 105 through a third contact hole H3. On the second insulating layer 104, an ITO layer 109 connected to the pad 101 and the first wire 105 is formed.

FIG. 12A to FIG. 12D show a process of fabrication, denoting the connecting part of the outer circuit taken along the line IV—IV in FIG. 10, and a schematic layout.

Figure 12A:
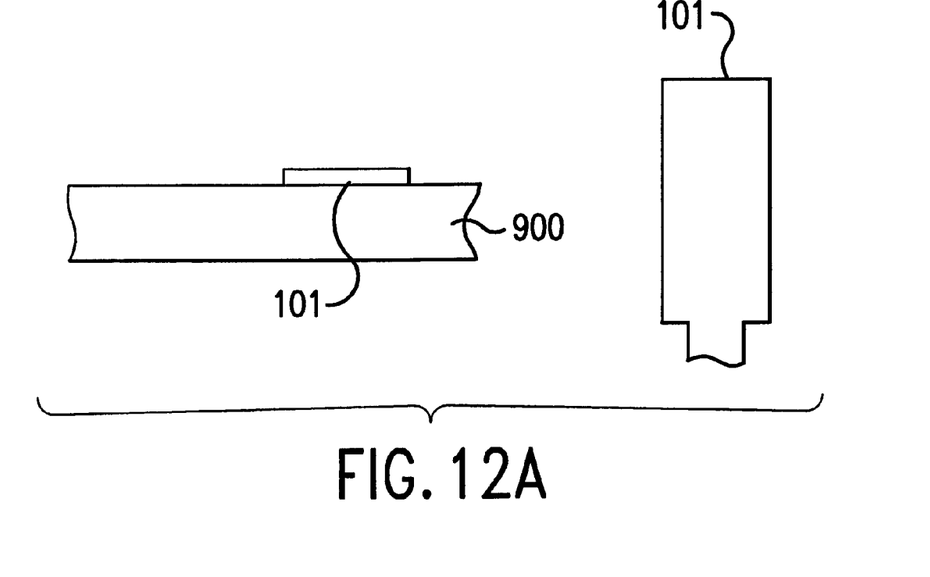
FIGS. 12A–12D show a process of fabricating the connecting part of the outer circuit and wires of the present invention.

Referring to FIG. 12A, a pad 101 is formed preferably by photolithography after a first conductive layer has been formed on an insulated substrate 500. The first conductive layer may be formed with a conductive material including one of Cr, Mo, Al and a combination of Cr, Mo and Al. The first conductive layer is used in forming source and drain electrodes or the data line.

Figure 12B:
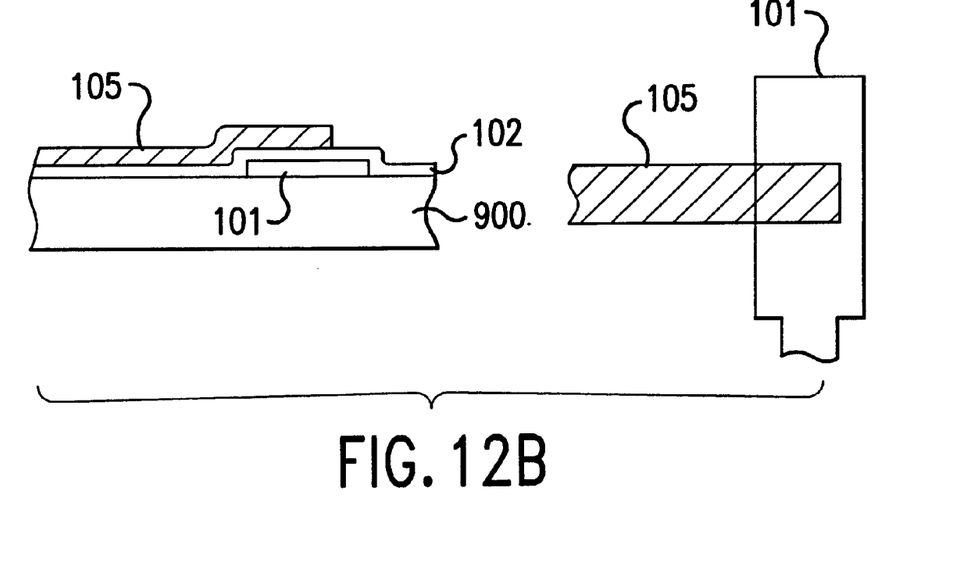

Referring to FIG. 12B, a first insulating layer 102 is formed covering the whole surface of the substrate. In this case, the first insulating layer 102 may be formed with either a silicon oxide layer or a silicon nitride layer. Then, a first wire 105 is formed preferably by photolithography after a second conductive layer has been formed over the insulated substrate 500. The second conductive layer may be formed which a conductive material including one of Cr, Mo, Al and a combination of Cr, Mo and Al. The second conductive layer is used in forming the gate electrode or the gate line. The first connecting wire 105, as shown in FIG. 4, is formed by patterning a portion of the wire 105 to be drawn out in a row-like fashion and a middle portion of the wire 105 to be drawn out in a column-like fashion. In this case, it is desirable that the shape of the first connecting wire be improved, as shown in FIG. 6. Moreover, the first insulating layer is preferably formed with a material having a low dielectric constant of less than 4.0.

Figure 12C:
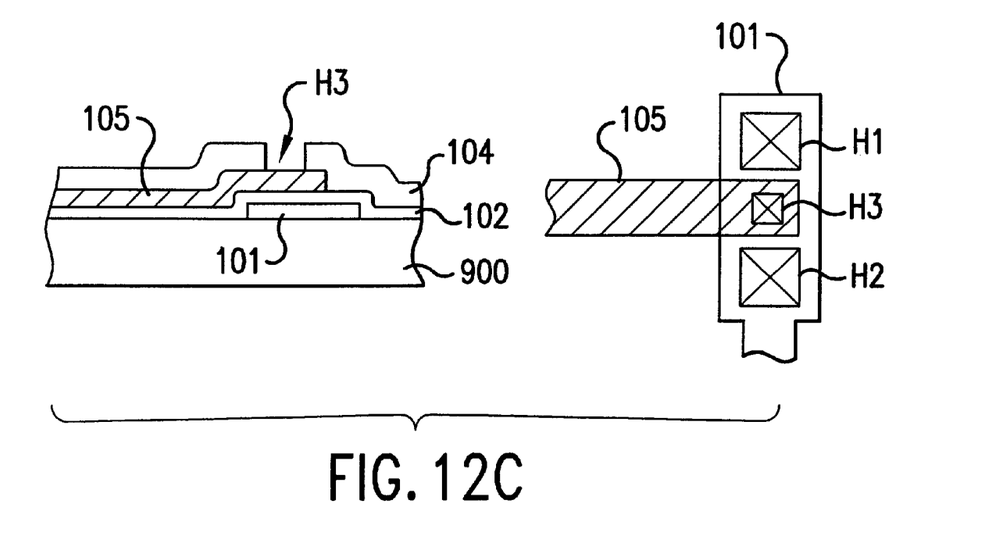

Referring to FIG. 12C, a second insulating layer 104 covering the whole surface of the substrate is formed. The second insulating layer 104 may be formed by means of depositing a silicon oxide layer or a silicon nitride layer. A first contact hole H1 and a second contact hole H2 exposes portions of the pad 101 and a third contact hole H3 exposes a portion of the first wire 105. The first contact hole H1 and the second contact hole H2 is formed in the first and the second insulating layers 102 and 104, and the third contact hole H3 is formed in the second insulating layer 104.

Figure 12D:
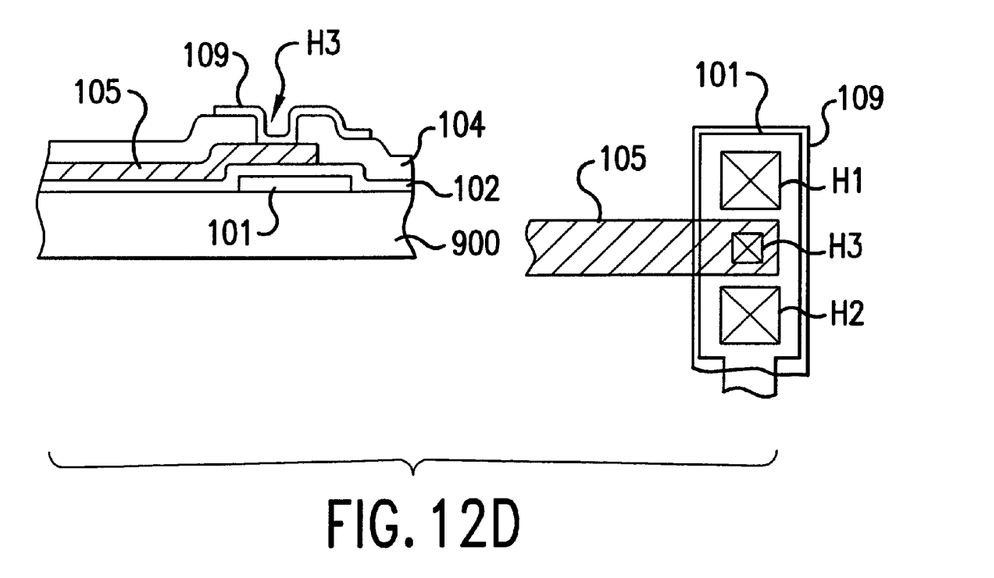

Referring to FIG. 12D, a transparent conductive layer, such as ITO, is formed to cover the whole surface of the resultant substrate. The ITO layer 109 is preferably formed by photolithography.

The present invention provides a compact stricture for an LCD panel by improving the arrangement of the connecting wires respectively to minimize a space occupied by the connecting wires connected to a driving circuit and the pads of an outer circuit connecting part. Moreover, in case of forming a connecting wire having a narrow width at a cross point with the pad, a signal distortion is reduced by minimizing the coupling capacitance by minimizing the overlapped area over the pad.

Accordingly, in the present invention, a compact panel structure of an LCD is provided by means of reducing a space occupied by conductive lines connecting an outer circuit to a driving circuit in a panel having the driving circuit in (one body.

It will be apparent to those skilled in the art that various modification and variations can be made in a connecting part of outer circuit in liquid crystal display panel of the present invention without departing from the spirit or scope of the inventions. Thus, it is intended that the present invention cover the modifications and variations of this invention provided they come within the scope of the appended claims and their equivalents.

What is claimed is:

1. A connecting part of an outer circuit in a liquid crystal display panel comprising:
   a substrate;
   a first connecting wire on said substrate;
   a first insulating layer on said first connecting wire, the first insulating layer having a first contact hole exposing a portion of said first connecting wire;
   a pad connected to said first connecting wire through said first contact hole; and
   a second insulating layer on said first connecting wire, the second insulating layer having a second contact hole exposing a portion of said pad; and
   a transparent conductive layer connected to said pad through said second contact hole.

2. The connecting part of an outer circuit in a liquid crystal display panel according to claim 1, wherein said first insulating layer includes a material having a low dielectric constant.

3. The connecting part of an outer circuit in a liquid crystal display panel according to claim 2, wherein the dielectric constant is less than or equal to 4.0.

4. The connecting part of an outer circuit in a liquid crystal display panel according to claim 1, wherein the first insulating layer includes a material having a dielectric constant of less than or equal to 4.0.

5. The connecting part of an outer circuit in a liquid crystal display panel according to claim 1, wherein the first connecting wire receives an input signal for an n input x m output device having a time division demultiplexing function, where m and n are integers and m is greater than n.

6. A method of fabricating a connecting part of an outer circuit in a liquid crystal display panel, comprising:
   forming a first connecting wire on a substrate;
   forming a first insulating layer on said first connecting wire;
   forming a first contact hole in said first insulating layer, said contact hole exposing a portion of said first connecting wire;
   forming a pad connected to said first connecting wire through said first contact hole; and
   forming a second insulating layer on sail first connecting wire, the second insulating layer having a second contact hole exposing a portion of said pad; and
   forming a transparent conductive layer connected to said pad through said second contact hole.

7. The method of fabricating a connecting part of an outer circuit in a liquid crystal display panel according to claim 6, wherein the first insulating layer includes a material having a dielectric constant of less than or equal to 4.0.

8. The method of fabricating a connecting part of an outer circuit in a liquid crystal display panel according to claim 6, wherein the first insulating layer includes a material having a dielectric constant of less than or equal to 4.0.

9. The method of fabricating a connecting part of an outer circuit in a liquid crystal display panel according to claim 6, wherein the first connecting wire receives an input signal for an n input x m output device having a time division demultiplexing function, where m and n are integers and m is greater than n.

10. A connecting part of a outer circuit of a liquid crystal device panel comprising:
    a substrate;
    a first connecting wire on the substrate;
    a first insulating layer covering said first connecting wire, the first insulating layer having a first contact hole exposing a portion of said first connecting wire;
    a pad connected to said first connecting wire through the first contact hole;
    a second insulating layer covering said first connecting wire, the second insulating layer having a second contact hole exposing a portion of the pad; and
    a transparent conductive layer connected to, the pad through the second contact hole.

11. The connecting part of an outer circuit in a liquid crystal display panel according to claim 10, wherein the first connecting wire has a first portion crossing the pad and a second portion not crossing the pad, the first portion having a width smaller than the width of the second portion.

12. The connecting part of an outer circuit in a liquid crystal display panel according to claim 10, wherein the first insulating layer includes a material having a dielectric constant of less than or equal to 4.0.

13. The connecting part of an outer circuit in a liquid crystal display panel according to claim 10, further comprising:
    a second connecting wire on the substrate, the first insulating layer covering said second connecting wire, the first insulating layer having a third contact hole exposing a portion of said second connecting wire;
    a second pad connected to said second connecting wire through the third contact hole, the second insulating layer covering said second connecting wire, the second insulating layer having a fourth contact hole exposing a portion of the second pad; and
    a transparent conductive layer connected to the second pad through the fourth contact hole.

14. The connecting part of an outer circuit in a liquid crystal display panel according to claim 13, wherein the second connecting wire has a first portion crossing the pad and a second portion not crossing the pad, the first portion having a width smaller than the width of the second portion.

15. The connecting part of an outer circuit in a liquid crystal display panel according to claim 13, wherein the first insulating layer includes a material having a dielectric constant of less than or equal to 4.0.

16. The connecting part of an outer circuit in a liquid crystal display panel according to claim 13, wherein the first pad is located at a first end portion of the connecting part and the second pad is located at a second end portion of the connecting part.

17. The connecting part of an outer circuit in a liquid crystal display panel according to claim 10, wherein the first connecting wire receives an input signal for an n input x m output device having a time division demultiplexing function, where m and n are integers and m is greater than n.

* * * * *